United States Patent
Albrecht et al.

(10) Patent No.: US 7,627,452 B2
(45) Date of Patent: Dec. 1, 2009

(54) METHOD AND DEVICE FOR PREDICTING A FAILURE FREQUENCY

(75) Inventors: Volker Albrecht, Notzingen (DE); Dieter Nau, Rechberghausen (DE); Stefan Odermatt, Hechingen (DE)

(73) Assignee: Daimler AG, Stuttgart (DE)

( * ) Notice: Subject to any disclaimer, the term of this patent is extended or adjusted under 35 U.S.C. 154(b) by 301 days.

(21) Appl. No.: 10/564,257

(22) PCT Filed: Jul. 6, 2004

(86) PCT No.: PCT/EP2004/007359

§ 371 (c)(1), (2), (4) Date: May 3, 2006

(87) PCT Pub. No.: WO2005/006097

PCT Pub. Date: Jan. 20, 2005

(65) Prior Publication Data

US 2007/0035901 A1  Feb. 15, 2007

(30) Foreign Application Priority Data

Jul. 10, 2003 (DE) ................................ 103 31 207

(51) Int. Cl.
*G06F 19/00* (2006.01)
*G06F 17/40* (2006.01)

(52) U.S. Cl. .................. 702/182; 340/679; 340/680; 702/33; 702/34; 702/187; 702/189

(58) Field of Classification Search .............. 340/500, 340/540, 679, 678, 680; 702/1, 33, 34, 127, 702/182, 183, 184, 187, 188, 189

See application file for complete search history.

(56) References Cited

U.S. PATENT DOCUMENTS 2,883,255 A * 4/1959 Anderson ..................... 346/34

(Continued)

FOREIGN PATENT DOCUMENTS

DE 197 51 273 5/1999

(Continued)

OTHER PUBLICATIONS

R. Bothwell et al., Reliability evaluation: A field experience from Motorola's cellular base transceiver system, Reliability and Maintainability Symposium, 1996 Proceedings. International Symposium on Product Quality and Integrity., Annual Las Vegas, NV, USA, Jan. 22-25, 1996, IEEE, US, Jan. 22, 1996, pp. 348 to 359, XP010160856, ISBN 0-7803-3112-5.

(Continued)

*Primary Examiner*—Edward R Cosimano
(74) *Attorney, Agent, or Firm*—Davidson, Davidson & Kappel, LLC (57) ABSTRACT

A device and a method for predicting the mean time period between two failures of a technical system, for example a manufacturing system or an assembly system for motor vehicle components. The device includes a components list (130.1, 130.2). Those components of the technical system which are included in this components list are the maintenance-intensive components. Every failure of a component of the list leads to a failure of the system. Furthermore, the device includes an apparatus for acquiring setpoint MTBF values of all the components of the list. A setpoint MTBF value of a component is a requested or planned mean time period between two failures of this component. The apparatus predicts the planned mean time period between two failures of the technical system as a function of the setpoint MTBF values of the components.

22 Claims, 5 Drawing Sheets

U.S. PATENT DOCUMENTS

| | | | |
|---|---|---|---|
| 5,132,920 A | * | 7/1992 | Bellows et al. ............... 702/184 |
| 6,532,426 B1 | * | 3/2003 | Hooks et al. ................... 702/81 |
| 7,149,673 B1 | * | 12/2006 | Brand et al. ................... 703/14 |
| 2001/0023376 A1 | | 9/2001 | Uchida et al. ................ 700/101 |

FOREIGN PATENT DOCUMENTS

| | | |
|---|---|---|
| DE | 198 48 094 | 4/2000 |
| EP | 1 146 468 | 10/2001 |
| EP | 1 160 712 | 12/2001 |
| JP | 10-107793 | 4/1998 |
| WO | WO 00/72212 | 11/2000 |
| WO | WO 01/26005 | 4/2001 |

OTHER PUBLICATIONS

E.K. Melnick et al., R&M Design Influence from Spreadsheet Analysis, 1988 Proceedings Annual Reliability and Maintainability, Jan. 26, 1988, pp. 336 to 339, XP010072459.

P. Wirkstrom et al., Reliability, availability and maintainability (RAM) of high power variable speed drive systems (VSDS), Petroleum and Chemical Industry Conference, 1998, Industry Applications Society 45$^{th}$ Annual Indianapolis, IN, USA, Sep. 28-30, 1998, New York, NY, USA, IEEE, US, Sep. 28, 1998, pp. 139 to 148, XP010312472, ISBN 0-7803-4897-4.

T. Elmore, Case study: modular ate system design, Conference Proceedings Article, Sep. 18, 2000, pp. 576-583, XP010522042.

German Categorization of Manufacturing Methods DIN 8580 as presented in Dubbel—Taschenbuch fuer den Maschinenbau (Handbook for Mechanical Engineering), 20$^{th}$ edition, Springer Verlag 2001, Chapter S, see specification.

Description of URI structure available at http://www.w3.org/Addressing, accessed on Jan. 17, 2006.

VDI Guideline VDI 2885, see specification.

German Categorization of Manufacturing Methods DIN 31 051, see specification.

German Categorization of Manufacturing Methods DIN 40041, see specification.

German Categorization of Manufacturing Methods DIN EN 61703, see specification.

VDI 3423, Technical Availability of Machines and Production Lines, Jan. 2002, pp. 1 to 19.

\* cited by examiner

METHOD AND DEVICE FOR PREDICTING A FAILURE FREQUENCY

The invention relates to a device and a method for predicting the mean time period between two failures of a technical system, for example a manufacturing system or an assembly system for motor vehicle parts.

BACKGROUND

A manufacturing system for motor vehicle parts, for example for cylinder heads, is designed for a planned period of use of several years. Unplanned failures during the period of use give rise to considerable costs which under certain circumstances significantly exceed the costs of procuring the manufacturing system. For this reason, methods for being able to predict the frequency of unplanned failures, the down times and the costs resulting from the failures at an early time, for example when a manufacturing system is procured, are desired.

In VDI guideline VDI 2885, standard data for maintenance planning is defined and a procedure for determining maintenance costs is disclosed.

DE 19848094 A1 describes a method for predicting the effects of planned and random events on the availability of a technical system. A model of the technical system is required which reflects the interaction of components of the technical system. In particular, the model describes how the failure of one component affects the entire technical system. The time profile of the system availability is predicted using Monte-Carol simulations as a function of a maintenance strategy for the technical system.

Setting up such an availability model requires a large amount of expenditure and often cannot be carried out within an acceptable time for complex technical systems, for example manufacturing systems. To carry out the Monte-Carlo simulations it is necessary for statistical models for the unpredicted events and failure probabilities of all the components to be known as well as for a maintenance strategy to be predefined. These requirements are in fact often not met before, or at the start of, the use of manufacturing system.

EP 1160712 A2 discloses a device and a method for predicting the times of failures ("timing of a future service event") of a technical system. Maintenance-related information, for example decomposition of the system and its components, failures and their repairs in the past as well as factors for the maintenance are required. The maintenance-related information is analyzed statistically in order to determine the components of reliability values, for example the times between failures. Furthermore, data relating to the performance of the system is acquired and performance losses during ongoing operation are determined using the information about failures and about the performance. Future failures are predicted by means of a simulation.

EP 1146468 A2 discloses a device and a method for predicting the times and costs of failures ("service event") during the period of use of a technical system. The maintenance-related information which is known from EP 1160712 A2 is also required for this approach. Said information is analyzed statistically.

The approaches described in EP 1160712 A2 and EP 1146468 A2 require a simulation model for the times of future failures to be able to be predicted. Such a simulation model can often not be generated at all or not be generated with acceptable expenditure, in particular if the technical system is a complex dynamic one. Furthermore, the required characteristic values relating to the performance of the system are only available during ongoing operation if the components interact, but not before activation takes place.

DE 19751273 A1 describes a method for generating and handling a technical database which is available during the period of use of a technical system. Data relating to all the components of the technical system is collected in a uniform database at the earliest possible time, stored and updated. The database is managed using a uniform user interface. The database can be used, for example, for troubleshooting on the technical system as well as for training maintenance technicians.

DE 19751273 A1 describes the use of data relating to failures in the technical system for troubleshooting, but not the prediction of failure frequencies or down times. In the case of a complex technical system, the database can also become extensive and require a large amount of data which is not yet available at an early time of the period of use of the system.

WO 00/72212 A2 discloses a method and a device for determining the overall costs ("total cost of ownership") of a complex system. The technical system is, for example, a production line. Information which relates to at least one aspect of the system, for example the function required by the system, is procured from an information system for various disciplines. Furthermore, information relating to the use of the system, for example the production planning with a production line as the technical system, is procured from the information system. The overall costs are determined from these two information items.

WO 01/26005 A1 discloses a method for analyzing the costs during the acquisition and operation of an IT system. The costs for acquisition and installation, for ongoing operating costs, for example for monitoring and fault recovery, and indirect costs, are differentiated. Depending on the characteristics of the IT system, on user profiles and on the operational organization, formal estimation methods ("appraisal metrics") are applied, for example formulas which supply costs as a function of statistical characteristic values of an IT system and of the operator company. The results are compared with established reference values ("benchmarks").

These methods require data which is not available with sufficient data quality before the system is procured. Furthermore, it is already impossible to carry out the methods for complex systems because they give rise to unwieldy models which are difficult to comprehend and verify.

US 2001/0023376 A1 discloses an information system for parts. A user enters a specification for parts into the information system. Types of parts which fulfill this specification are determined. For this purpose, the information system accesses various management systems, for example one for parts numbers, one for quality assurance, one for the management of stocks, one for the control of sales and marketing, one for the recording and monitoring of costs, one for production planning and one for sales control. The parts which are determined are displayed in a certain sequence which depends on the frequency of use and the degree of standardization of the respective part.

US 2001/0023376 A1 does not describe how the information about the parts which are determined or the sequence in which the parts are displayed is used to predict failure frequencies or down times.

SUMMARY OF THE INVENTION

The invention is based on an object of providing a method and a device for predicting the mean time period between two failures of a technical system at low cost without a complicated model or measurement data from the ongoing operation of the technical system being required for this.

The device comprises a components list. Those components of the technical system which are included in this list are the maintenance-intensive components. Every failure of a component on the list leads to a failure of the system. The components included on the list are, as it were, connected in series.

Furthermore, the device comprises an apparatus for acquiring setpoint MTBF values for the components of the components list. A setpoint MTBF value is acquired for each component of the components list. MTBF stands for "mean time between failures". An MTBF value of a component is the mean time period between two failures of the component. The setpoint MTBF value is accordingly the required or planned mean time period between two failures of the component.

The data acquisition device comprises, for example, an input field in a form which is shown on the screen, an editor for generating a file in the "eXtensible Markup Language" (XML) data format or an apparatus for inputting ("scanning") a paper form. In this case, the setpoint MTBF value is predefined. Alternatively the data input device comprises a device which determines the logged operating data for the component in already existing technical systems, calculates an actual MTBF value from said data using statistical methods, for example mean value formation, and derives the setpoint MTBF value for the component from the actual MTBF value.

Furthermore, the device comprises an apparatus for summing all the reciprocal values of the setpoint MTBF values which are acquired for the components of the components list. This apparatus therefore calculates the sum of the reciprocal values of the setpoint MTBF values of all the maintenance-intensive components.

The device calculates the reciprocal value of the sum of the reciprocal values. This reciprocal value is the predicted MTBF value of the technical system and functions as the mean time period MTBF_Sys to be predicted between two failures of the technical system. The device therefore determines a value for MTBF_Sys according to the computational rule $$MTBF\_Sys = \frac{1}{\sum_{i=1}^{n} \frac{1}{MTBF\_i}}$$

Here, MTBF_i is the acquired setpoint MTBF value of the component No. i of the components list.

It is also possible, however, to multiply the reciprocal value of the sum of the reciprocal values by a factor of less than 1. This factor takes into account in a general way failures of the technical system on the basis of failures of components which are not listed on the components list and for which no setpoint MTBF values are acquired. For example, MTBF_Sys is determined according to the computational rule $$MTBF\_Sys = \frac{\beta}{\sum_{i=1}^{n} \frac{1}{MTBF\_i}}.$$

The factor $\beta$ is determined from operational logs and indicates what proportion of all the failures of the technical system is due to a failure of a component of the components list.

The invention provides a device and a method which can also be handled for complex systems, for example manufacturing systems. This is because as a rule only a relatively small number of the components are maintenance-intensive. These components are contained on the electronic components list. Concentrating on this generally small number of maintenance-intensive components provides a good prediction at significantly lower cost for the generation of the prediction.

The expenditure on generating the prediction is reduced, on the one hand, by virtue of the fact that data is acquired only for a relatively small number of components, specifically for the components which are essential to the down times. On the other hand, only one value to be acquired is required per component, specifically the setpoint MTBF value of the component. This value has an illustrative significance, specifically a required or planned mean time period between two failures of the component. The use of the setpoint MTBF value does not require any statistical assumption about, for example, a certain probability distribution of failures.

The required data can already be obtained and acquired before the technical system is constructed. For example, the behavior of the corresponding components in already existing systems is monitored and evaluated. This permits a prediction which is already available at an early time in the lifetime of the technical system, for example after the completion of the design and before its manufacture.

A complicated model of the interaction between the components of the technical system is not necessary. Instead, each component of the components list is a component whose failure causes the technical system to fail. The components of the list are, as it were, connected in series. Because there is no need for a complicated model, for example, of the interaction between the components or of the reliability behavior of the system, the invention saves time and costs for the setting up and validation of such a model and avoids incorrect predictions which may result from a faulty model.

The mean technical availability of the system can be derived from the predicted MTBF value of the system.

The device according to the invention can be used for any technical system which is built up from components, for example for
- manufacturing systems for parts of vehicles
- conveyor and processing systems for mining,
- energy generation systems, for example power stations,
- systems for manufacturing or processing basic materials in the chemical industry, for example refineries or systems for manufacturing surface coatings or plastics,
- vehicles, for example cars, rail vehicles, aircraft, ships, spacecraft,
- telecommunications and data processing systems,
- printing machines,
- systems for manufacturing paper, cardboard, packaging,
- system for manufacturing foodstuffs and other consumables,
- system for manufacturing medicines,
- logistic systems, for example letter distributor systems or container lifting gantries in ports or railway stations,
- washing machines or other domestic appliances,
- electronic entertainment devices, for example music playback devices.

In addition to the MTBF value of the technical system, the mean time period for fault recovery after a failure of the technical system is preferably predicted. In an advantageous development, the device additionally may comprise an apparatus for acquiring setpoint MTTR values for the components of the components list. In addition, a setpoint MTTR value is acquired for each component of the components list. MTTR stands for "mean time to repair" or else "meant time to restoration". The MTTR value of a component is the mean time period for fault recovery on the technical system after a failure of the component. The setpoint MTTR value is therefore the required or planned mean time period for fault recovery on the technical system after the failure of the component. Various components may have different MTTR values and also different setpoint MTTR values.

The device predicts the mean time period for fault recovery after failure of the technical system as a weighted mean of the setpoint MTTR values of the components of the components list. The predicted mean time period MTTR_Sys for fault recovery on the technical system is therefore determined according to the computational rule $$MTTR\_Sys = \sum_{i=1}^{n} \alpha\_i * MTTR\_i.$$

Here, MTTR_i designates the acquired setpoint MTTR value of the component No. i and α_i designates the weighting factor for the component No. i. The reciprocal values of the setpoint MTBF values of the components are used as weighting factors. The computational rule $$\alpha\_i = \frac{1}{\sum_{j=1}^{n} \frac{1}{MTBF\_j}} * \frac{1}{MTBF\_i}$$

is therefore used for i=1, . . . , n.

Overall, the MTTR value of the system is predicted according to the computational rule $$MTTR\_Sys = \frac{\sum_{i=1}^{n} \frac{MTTR\_i}{MTBF\_i}}{\sum_{j=1}^{n} \frac{1}{MTBF\_j}}.$$

In one optional development of this embodiment, the device calculates the setpoint MTTR value of each component of the components list by adding the following two acquired values, specifically the setpoint MRT value of the component and the setpoint MTD value of the component.

MRT stands for "mean repair time". The MTD value of a component is the mean repair time up to the elimination of a failure in this component. MTD stands for "mean technical delay". The MTD value of a component is the mean time up to the restoration of the technical system after the elimination of a failure of this component.

The acquisition of the setpoint MTTR value of a component is reduced by this embodiment to the acquisition of two essential factors, and is thus configured in a particularly simple way.

The electronic components list with the maintenance-intensive components is preferably acquired from an electronic parts list. This parts list describes complete decomposition of the technical system into its components. The parts list therefore comprises not only the maintenance-intensive components but also all the other ones. The device also comprises an apparatus for characterizing a component as maintenance-intensive, for example for marking specific components of the parts list. The components list is automatically acquired from the parts list, with all the parts of the parts list which are characterized as maintenance-intensive being determined and compiled to form the components list.

It is possible for a user to characterize certain components of the parts list as maintenance-intensive. It is also possible that by evaluating operational logs which have been acquired by monitoring technical systems already in use it is determined which components already fail particularly frequently and/or cause particularly long down times and/or give rise to particularly high costs for fault recovery. For example, by evaluating the logs, an evaluation of the components of the parts lists is acquired, the higher the frequency of failure and the down time or failure recovery costs or a combination of these values, the higher the evaluation given to the component. Those components whose evaluation exceeds a predefined limit are characterized as maintenance-intensive. Alternatively, the N components with the highest evaluation are characterized, with N being a predefined number.

In an optional advantageous embodiment of the invention, the electronics parts list is valid for a category of technical systems which carry out the same functions. From this parts list with the device according to this embodiment it is possible to generate a components list which is valid for this category of technical systems. However, it is also possible to generate different components lists for various technical systems of the category from the same parts list and to use the device repeatedly for this purpose. A components list which functions as a components list for each system of the category, unless a different components list has been generated for a system, is preferably generated once in advance with the device.

A category of technical systems can be defined for the case in which the technical systems are manufacturing systems by means of the categorization of manufacturing methods according to DIN 8580. For example, a category includes all manufacturing systems which carry out a manufacturing method which is defined in a main group DIN 8580. It is also possible to divide a main group of DIN 8580 into a plurality of categories. DIN 8580 ("categorization of manufacturing methods") is presented, for example, in "Dubbel—Taschenbuch für den Maschinenbau" [machine engineering handbook]", 20th edition, Springer-Verlag, 2001, chapter S. One category is, for example, that of metal-removing systems for motor vehicle parts, another is that of joining systems for manufacturing motor vehicle assemblies.

The invention can be applied particularly advantageously to a plurality of technical systems of a category, for example for various manufacturing systems for manufacturing cylinder heads for motor vehicles. The technical systems of the category fulfill the same function, for example the manufacturing of the cylinder heads to a required number per month with a required level of quality from predefined raw parts. The invention provides a convenient method for comparing various technical systems of the category with one another without these systems already having to be in use. According to the invention, the respective failure frequencies and down times may be predicted for each of this plurality of systems. A comparison of the predicted values may be generated. The comparison makes it possible to compare the systems and to derive technical improvement possibilities from the comparison. Furthermore it becomes possible to compare competing offers for in each case one technical system of the category if these offers comprise failure frequencies and down times.

BRIEF DESCRIPTION OF THE DRAWINGS

An exemplary embodiment of the invention will be described in more detail below with reference to the appended drawings, in which.

DETAILED DESCRIPTION

The exemplary embodiment relates to manufacturing systems and assembly systems for motor vehicle parts, for example cylinder heads. The manufacturing systems and the assembly systems function as the technical systems in this example. A motor vehicle manufacturer or motor vehicle engine manufacturer uses various manufacturing and assembly systems of this kind and thus operates as a system operator. Such systems are frequently acquired for a planned service life of at least ten years. Because of technical innovations and changing requirements of the fabricated parts, the systems used at any one time differ from one another.

The category of systems for manufacturing motor vehicle cylinder heads functions in this example as a category of technical systems which carry out the same functions. The category of systems for assembling motor vehicle parts functions as a further category of technical systems.

In this exemplary embodiment, the motor vehicle manufacturer intends to procure a new system for manufacturing motor vehicle cylinder heads. To do this, the motor vehicle manufacturer specifies the system in functional terms, obtains competing offers from system manufacturers and employs the device according to the invention to compare the offers. A parts list 120.1 which is valid for the category describes a complete decomposition of a manufacturing system into components. In this parts list 120.1, specific components are characterized as maintenance-intensive. The listing of the characterized components is provided by the components list.

Each of the offers for a system comprises the following values:
  the information as to how often each component which is maintenance-intensive and therefore listed in the components list occurs in a system,
  the setpoint MTBF value of each maintenance-intensive component,
  the setpoint MTTR value of each maintenance-intensive component,
  the planned service life and the re-acquisition value of each maintenance-intensive component,
  the time taken for the planned maintenance of each maintenance-intensive component and the costs of the materials required for it.

From this information, the device according to the invention determines
  a prediction of the MTBF value and one for the MTTR value of the system specified in the offer,
  the costs for the exchange of maintenance-intensive components which fail and have to be replaced during the service life of the system,
  the time required and the costs for the planned maintenance of the system.

The device generates a comparison of all the systems specified in the offers. This comparison comprises the predicted MTBF value and the predicted MTTR value of each system, the costs for re-acquisition of failed, maintenance-intensive components of each system and the time required and the costs for the planned maintenance of each system. The comparison therefore comprises reliability values and cost values as well as time requirement values. It is a resource for comparing in advance the systems and thus the offers in terms of their behavior during ongoing operation.

The motor vehicle manufacturer selects a system and thus an offer. He concludes a contract with the supplier of the system, in which contract the setpoint MTBF value and the setpoint MTTR value of each maintenance-intensive components of the system, the costs for replacing maintenance-intensive components of each system and the time required and the costs for the planned maintenance of the system are agreed. The agreed values are monitoring during the ongoing operation of the system. If the actual values differ considerably from the setpoint values which have been agreed contractually, suitable technical measures are taken, for example structural improvements or changed conditions of use of the system.

Figure 1:
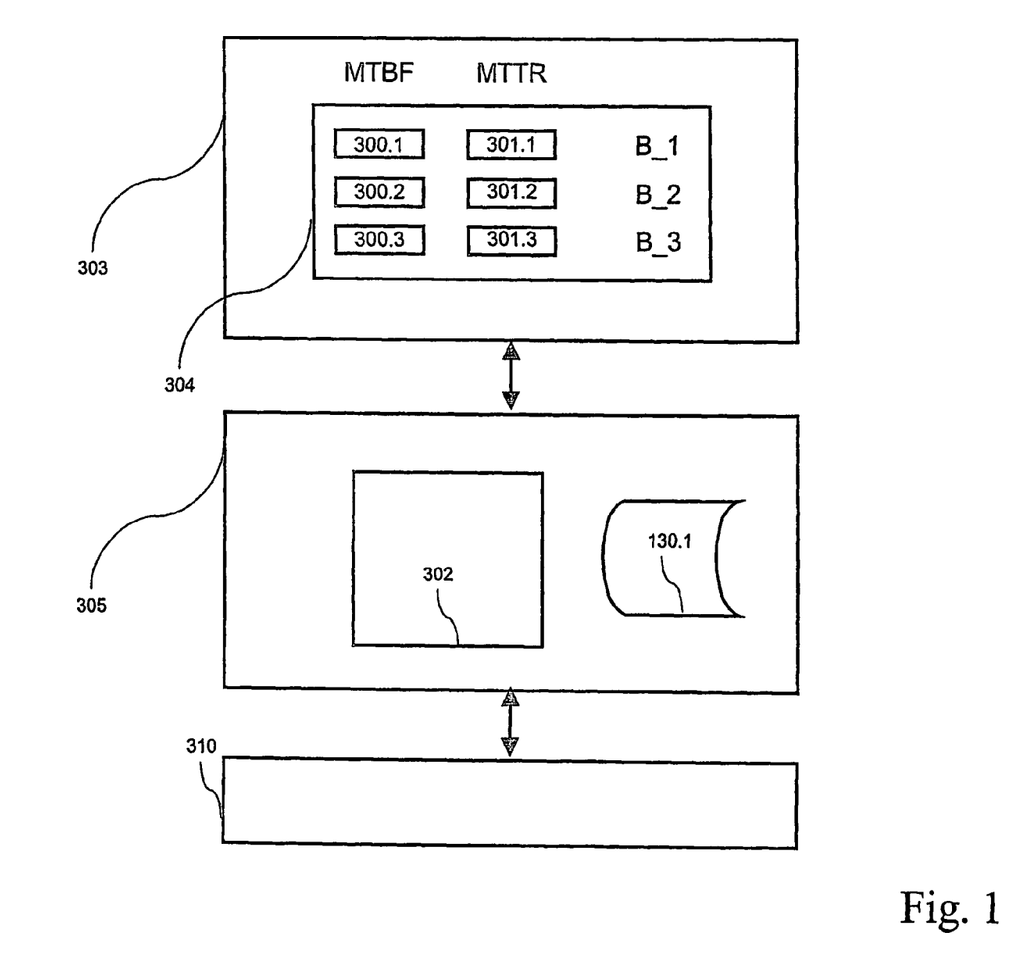
FIG. 1 shows an architecture of an embodiment of the device according to the invention.

FIG. 1 shows an exemplary architecture of the device according to the invention. In this example, the device according to the invention is implemented using a workstation computer. The "actual data processing device" 305 is connected to a screen 303 and a keyboard 310. In this embodiment the device comprises the following components:
  an electronic components list 130.1 in the form of a data memory with a data object for each maintenance-intensive component,
  a device for acquiring the setpoint MTBF values of the components
  and a device for calculating the mean time period between two failures of a system and for calculating the mean time period for fault recovery after a failure of this system.

The acquisition device comprises a keyboard 310 and an electronic form 304 which is displayed on the screen 303. The form comprises, per component of the components list, two input fields into which an operator types the setpoint MTBF value and the setpoint MTTR value of the respective component or inputs it using a voice processing program. In the example in FIG. 1, three setpoint MTBF input fields 300.1, 300.2, 300.3 and three setpoint MTTR input fields 301.1, 301.2, 301.3 are shown for three components B_1, B_2, B_3. On the right, the name of the respective component is entered next to each input field. The form 304 is generated automatically as a function of the components which are taken into account in the components list 130.1. If the components list 130.1 has a component added to it or if a component is removed, the form is therefore automatically adapted to the change. Furthermore, the data acquisition device comprises means for reading out the input setpoint MTBF values and setpoint MTTR values from the respective input fields and means for checking the plausibility of the input values.

The reading-out means transfer the setpoint MTBF values and setpoint MTTR values to a calculation device 302. The calculation device 302 calculates the mean time period to be predicted between two failures of the system and the predicted mean time period for fault recovery after a failure from the setpoint MTBF values and setpoint MTTR values. In this context, the calculation device 302 applies the computational rules specified above.

The calculation device 302 calculates the two values to be predicted for each system offered and generates a comparison, for example in the form of a table with one line per system and one column per value to be predicted. The device preferably generates a graphic representation of this table.

Figure 2:
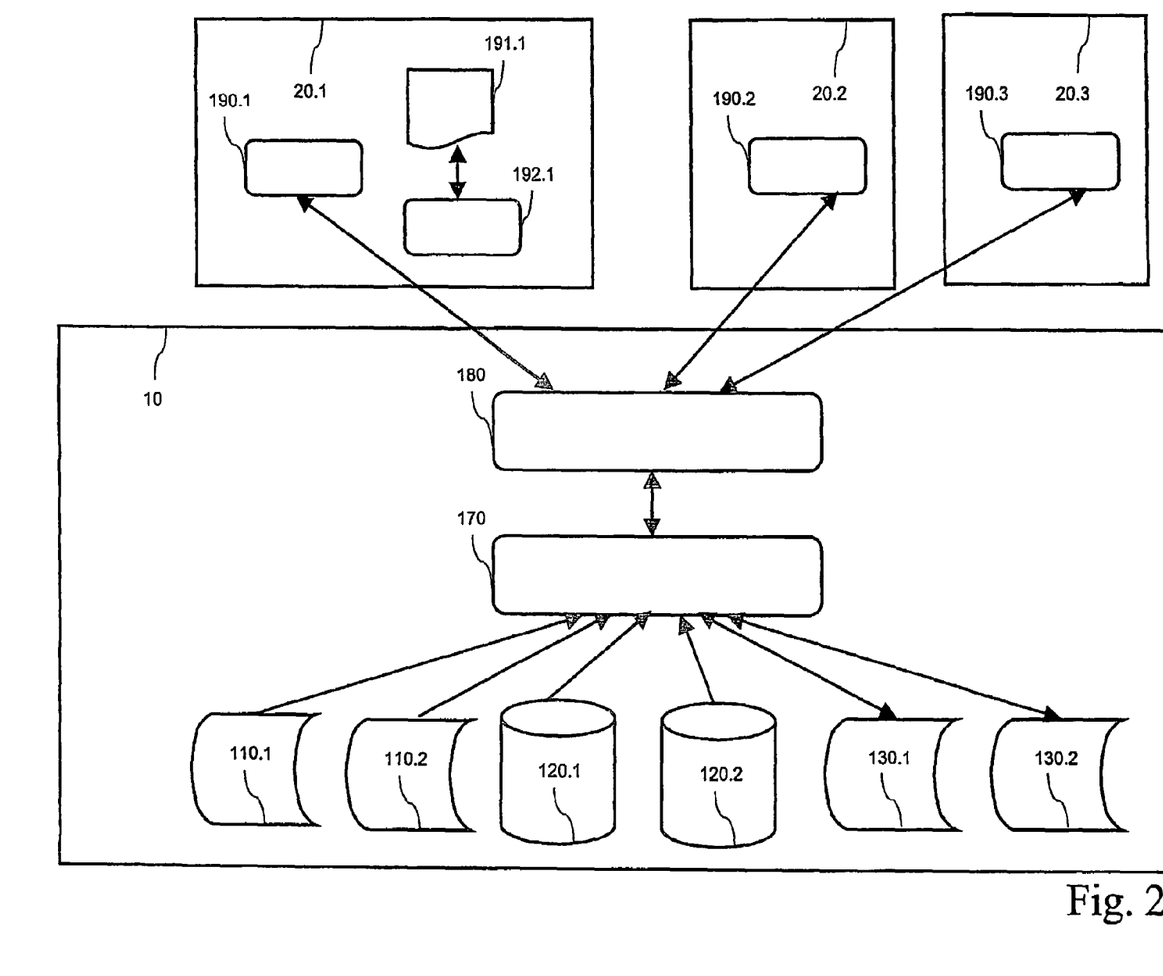
FIG. 2 shows an architecture of a further embodiment of the device according to the invention.

In a further embodiment, the device according to the invention is implemented using a network central computer 10 ("server") and a plurality of network subscriber computers 20.1, 20.2, . . . ("clients"). The network subscriber computers are connected to the network central computer 10 by the Internet or an Intranet. The architecture of the device comprises the following three layers:

the data storage layer for storing data,
the application layer for carrying out the evaluations and generating the comparisons, and
the representation layer for representing the generated comparisons.

FIG. 2 shows the architecture of this embodiment of the device according to the invention. In this example, the network central computer 10 is connected to three network subscriber computers 20.1, 20.2, 20.3. The arrows in FIG. 2 stand for data flows.

The following databases and software programs are installed on the network central computer 10:

per category, one electronic system list 110.1, 110.2 which lists all the systems of the category taken into account, and the systems may originate from different system manufacturers, per category, one electronic parts list 120.1, 120.2 which is valid for all the technical systems of a category and describes a decomposition of a system of the category into its components, per category, an electronic components list 130.1, 130.2 which comprises the maintenance-intensive components of the technical system, an Internet response program 180 ("web server") which receives requests and enquiries which are received from a network subscriber computer 20.1, 20.2, . . . using, for example, the protocol HTTP, and passes on the responses and reactions generated by the network central computer 10 to the enquiring network subscriber computer 20.1 or 20.2 or 20.3, interlinking software 170 ("middleware") for interlinking the databases and electronic Lists to the Internet response program 180.

In this example, a parts list 120.1 for the category of the manufacturing systems and a further parts list 120.2 for assembly systems is stored on the network central computer 10. A system list 110.1 is correspondingly stored for manufacturing systems, and a further system list 110.2 for assembly systems, and a components list 130.1 for manufacturing systems, and a further components list 130.2 for assembly systems.

An Internet response program 180 is understood to be a program on the network central computer 10 which transfers Internet pages to enquiring network subscriber computers 20.1, 20.2, . . . . The enquiring network subscriber computer has beforehand transferred the request to The Internet response program 180 by means of an Internet address which is specific to the Internet response program 180, by, for example, selecting specific alternatives on an Internet page represented by the Internet access program 190. The address has the form of a "uniform resource identifier" (URI). w3.org/Addressing/ describes how a URI is structured, said page having been searched on Aug. 1, 2003. The Internet page is either static or dynamic. A dynamic Internet page is generated by the Internet response program 180. To do this, the Internet response program 180 transmit requests to one of the databases and uses the responses to generate the Internet page.

The interlinking software 170 makes it possible to replace one database system with another without having to change the rest of the device.

All the network subscriber computers 20.1, 20.2, . . . are connected to the network central computer 10 via the Internet or an Intranet. The following software programs are installed on the network subscriber computer 20.1 which is set up at the premises of the motor vehicle manufacturer, and thus of the system operator:

an Internet access program 190.1 ("web browser") which is capable of transmitting requests to the network central computer 10 and is capable of representing an Internet page which is to be transferred by the network central computer 10, a table calculation program 191.1 which generates comparisons of failure frequencies and times in a table and graphic form, and an interface program 192.1 which functions as an information transfer interface between the programs and databases on the network central computer 10 and the table calculation program 191.1 on this network subscriber computer 20.1.

The following software programs are installed on the two network subscriber computers 20.2 and 20.3 which are set up at two manufacturers of systems of the category:

an Internet access program 190.2 or 190.3 ("web browser") which is capable of transmitting requests to the network central computer 10 and of representing an Internet page transferred from the network central computer 10.

The components lists and the parts lists are stored, for example, a hierarchical, relational, object-oriented or object-relational database, a set of XML files, a file management system with files or an unstructured data store connected to a semantic network and a search machine. The data which is stored in the database may be stored, for example, on a permanent memory of a data processing device or a portable data memory medium, for example a CD-ROM.

The device according to the invention comprises a tree-like electronic parts list 120.1, 120.2 for each category. The root of the parts list represents the entire system and the further nodes represent the components. One node for one component A is the successor of a node for a component B if A is part of B. In the parts list, each component of the system is represented by a node, even the non-maintenance-intensive components.

As described above, two categories are differentiated in this exemplary embodiment. For this reason, the device comprises two electronic parts lists 120.1, 120.2. The parts list 120.1 describes a decomposition of a system for manufacturing motor vehicle cylinder heads into its components and is valid for each system in this category. The imaginary decomposition of a system is preferably a functional decomposition, that is to say decomposition into functional components. A functional component may be implemented in various systems of the category by different physical components.

The parts list 120.1 which is valid for the category of the systems for manufacturing cylinder heads is divided into the following four detailing planes, specifically:

production system (entire system)
subsystems
functional groups
groups of parts.

The entire fabrication system is composed of subsystems. One subsystem is composed of functional groups. A functional group is composed of groups of parts.

The subsystems of a manufacturing system include:
- conveyor equipment,
- cylinder head processing,
- installation equipment and peripherals,
- computational equipment.

The functional groups of the subsystem "cylinder head processing" include the functional groups:
- linear axis/rotational axis,
- working spindle,
- hydrostatics,
- tool changing system,
- working space,
- lubrication system,
- measuring equipment/measuring control,
- clamping of workpieces,
- pallet changer.

The groups of components of the functional group "working spindle" include the groups of components:
- drive,
- bearings,
- clamping element/clamping device,
- cooling system,
- rotary leadthrough,
- lubrication system,
- sensor system,
- tool clamping system,
- tool fracture monitoring system,
- balancing system,
- measuring system,
- additional functions.

The groups of parts of the function group "measuring equipment/measuring control" include the groups of parts:
- measured value pickup,
- drive,
- guide,
- bearing system,
- calibration device,
- moving peripherals,
- additional functions.

The parts list 120.2 which is valid for the further category comprises the four detailing levels listed above. One assembly system comprises the subsystems:
- actual assembly
- conveyor equipment
- computing connection
- installation equipment and peripherals
- screw equipment
- robot equipment
- stored-program controller.

The subsystem "actual assembly" is composed of the function groups:
- linear axis,
- feed equipment,
- lifting out device with/without indexing,
- protective devices,
- pressing-in equipment,
- grippers,
- oil feed system,
- labeling,
- displacer device,
- turning station,
- lifting station,
- tilting station,
- rotation station.

NB: the function group "labeling" labels the mounted motor vehicle parts. Labeling of the assembly system itself is therefore not meant.

The function group "linear axis" comprises the groups of parts:
- moving peripherals,
- guidance,
- additional functions,
- drive,
- ball screw element.

Groups of parts with the same name may occur in different functional groups, for example both the functional group "working spindle" and the functional group "measuring equipment/measuring control" each include a group of parts "drive". The subdivision to the level of the groups of parts leads to a uniquely defined definition which is valid for all the systems of the category and which defines how the function groups and subsystems are delimited.

Because the imaginary decomposition of the system which gives rise to the parts list 120.1 is functional and generic different technical implementations are possible for one functional component. For example, the group of part/measured value pickup can be implemented by at least one touch probe, at least one measuring mandrel or at least some other measured value pickup. As a result, the parts list 120.1 does not need to be adapted to every technological innovation but rather only to functional changes. The same applies to the other parts list 120.2.

If a system has a plurality of components of identical design, this component is listed only once in the parts list. If, for example, a system for manufacturing cylinder heads always has five linear axes or else between three and six linear axes, only one linear axis is specified on the parts list 120.1 for this category. The parts list is thus valid for every system of the category, irrespective of the number of linear axes which are respectively present.

The network subscriber computer 20.1 at the system operator permits a user whose has the corresponding authorizations to access the parts lists 120.1, 120.2 and to cause them to be displayed using the Internet access program 190.1. The user also has the possibility of changing and extending the parts lists 120.1 and 120.2 using the Internet access program 190.1, for example by adding, by copying or by deleting components of a system or by "repositioning" components in the respective parts list. Repositioning moves a component to another location in the tree-like decomposition.

Furthermore, the Internet access program 190.1 permits a user to characterize specific components of a system which are to be taken into account in the parts list 120.1 or parts list 120.2 as maintenance-intensive. To do this, the user selects specific components of the parts list and characterizes them as maintenanceintensive. Any component characterized as maintenance-intensive brings about a failure of the entire system.

By pressing a button it is automatically determined which components of the parts list are characterized in this way. These components are placed in a components list.

The following function groups in the parts list 120.2 for assembly systems are characterized, for example, as maintenance-intensive:
- linear axis (pneumatic cylinder),
- linear axis (NC drive),
- labeling,
- transport elements,
- rotation station,
- workpiece carrier.

In this example, a linear axis can be implemented in two different ways, specifically with a pneumatic cylinder or with NC drive. A system may have one or more linear axes with a pneumatic cylinder or one or more linear axes with NC drive.

Furthermore, in each function group which is characterized as maintenance-intensive, individual groups of parts of this function group are preferably characterized as maintenance-intensive. In the components list identifiers of the maintenance-intensive function groups and the maintenance-intensive groups of parts as well as definitions of which of these groups of parts are associated with which of these function groups are stored.

It is possible to characterize different components as maintenance-intensive in the same parts list for different systems for a category. For example, for one system the linear axis (NC drive) is maintenance-intensive and for another a bed track guide is maintenance-intensive. As a result different components lists 130 are produced for different systems of the same category.

The device according to the invention predicts the mean time period between two failures of a technical system. A number of terms which are associated with failure will be defined below.

It is possible to characterize different components as maintenance-intensive in the same parts list for different systems for a category. For example, for one system the linear axis (NC drive) is maintenance-intensive and for another a bed track guide is maintenance-intensive. As a result different components lists 130.1, 130.2 are produced for different systems of the same category.

The entire occupation time (T_b) of a technical system, for example of a manufacturing system, is divided, by analogy with the VDI guideline 3423, into the following times:

use time (T_n)=net production time as the sum of those time periods in which the system fulfills its planned function without restriction and produces the required number of fault-free motor vehicle parts at full capacity, planned idle time (T_s), technical down time (T_t).

The planned idle time is composed of:

maintenance time (T_w), organizational down time (T_o).

Figure 3:
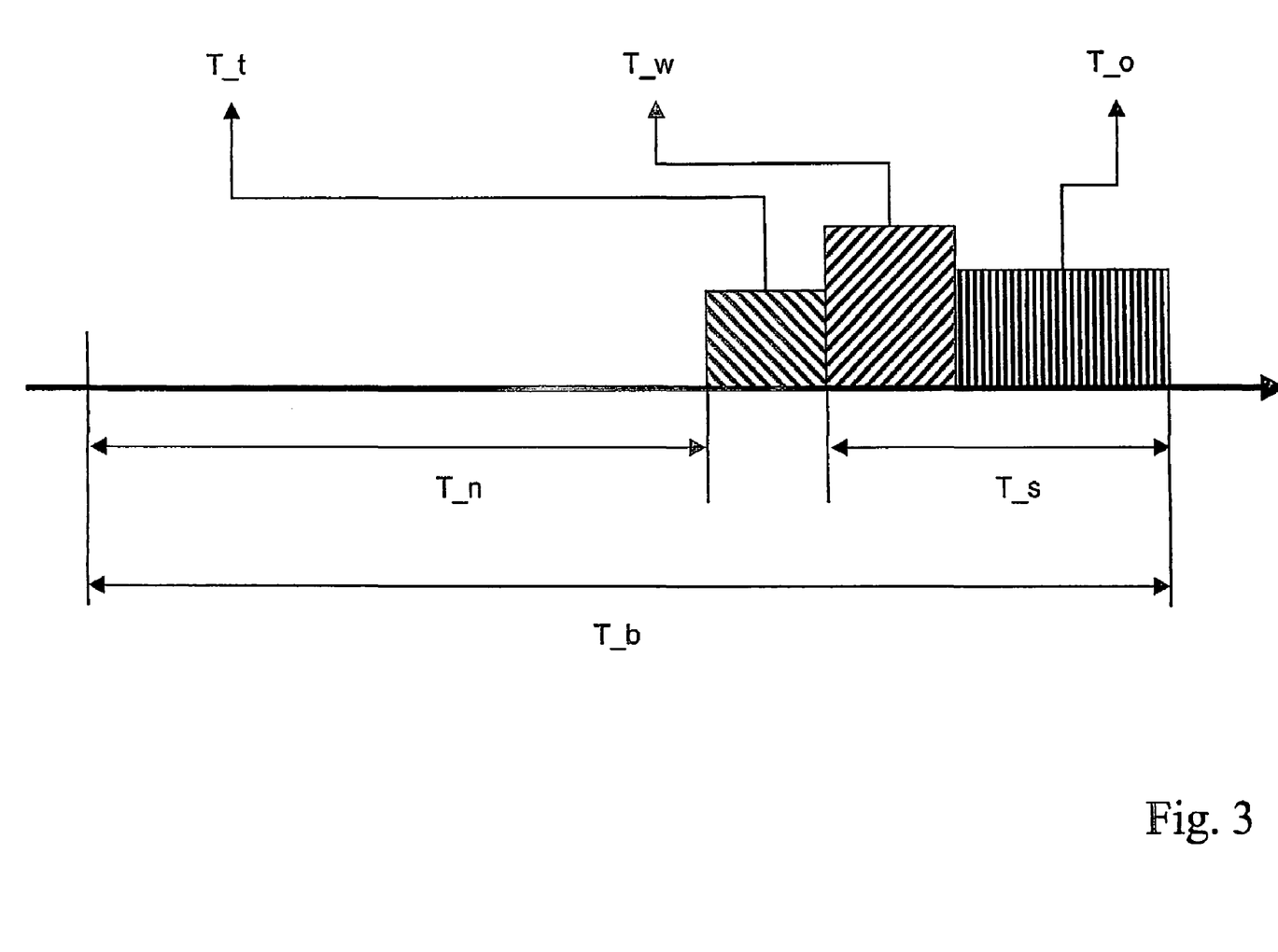
FIG. 3 shows the division of the operating time of a system.

FIG. 3 illustrates the division of the occupation time of a system.

The maintenance time is provided for carrying out operations which are carried out in accordance with a maintenance plan and generally independently of failures of the system. These include the planned maintenance and servicing of the system (for example lubrication, cleaning). The organizational down time results from the processing of production processes or from organizational deficiencies. The organizational down time includes, for example, times which are caused by tool changes, meetings, breaks, times for safety training or the absence of workpieces or energy. "Maintenance time" is understood to be the time according to a maintenance plan for planned maintenance and servicing to be performed on the system. The system operator is responsible for the "maintenance time" and the "organizational down time".

Technical down times result from unplanned failures of components of the system and lead to unplanned idle times. Preferably only technical down times for which the system manufacturer is responsible are taken into account. The causes of such failures are deficiencies in the conception or the implementation of the system, for example failures of material, deficiencies of the system design, immature equipment, manufacturing, assembly and documentation faults.

Figure 4:
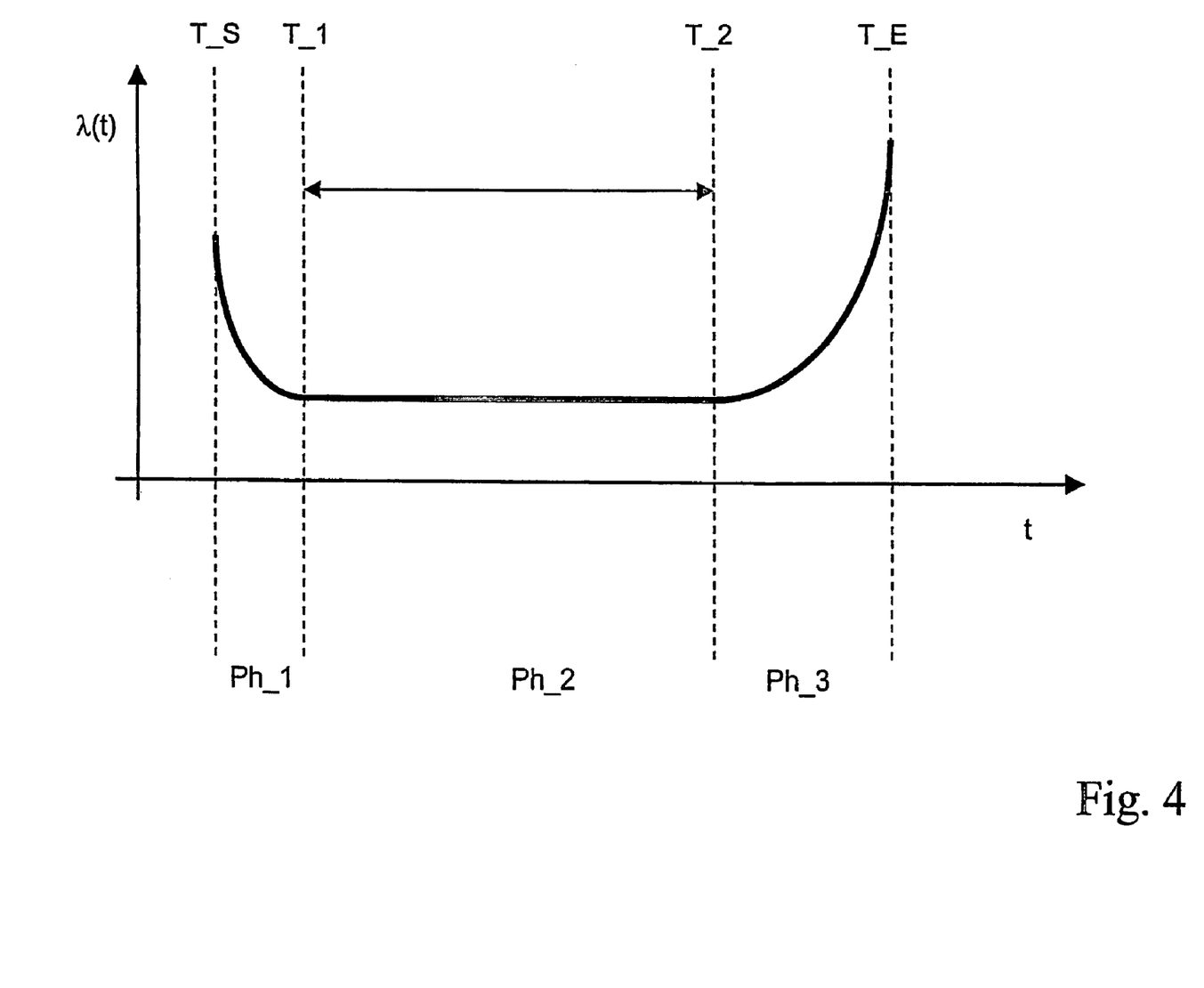
FIG. 4 shows a profile of the failure rate $\lambda(t)$ as a function of the elapsed time.

The failure rate $\lambda(t)$ is understood to be, in accordance with DIN 40041 and EN 61703, the number of failures per time unit. Here, t designates the time which has elapsed since the system was activated. FIG. 4 shows a typical profile of the failure rate $\lambda(t)$ as a function of the time which has elapsed. This profile is often referred to as a "bathtub curve". T_S designates the time of activation, T_E designates the time when the system is put out of service. Three different phases in the "service life" of the system, that is to say the time period between T_S and T_E can be differentiated:

the phase Ph_1 of the early failures ("teething problems") of the system, the phase Ph_2 of the random failures, the phase Ph_3 of the failures due to wear.

In phase Ph_1 of the early failures the failure rate $\lambda(2)$ drops. The causes of damage are predominantly faults by the manufacturer of the system. Typical examples are faults in materials, assembly and manufacturing, design faults, technologies which are not mature.

In phase Ph_3 of the failures due to wear the failure rate $\lambda(t)$ rises. The system has arrived at the end of its service life. Failures result, for example, from ageing, wear, fatigue.

The operating time is preferably moved into the phase Ph_2 of the random failures. The starting time T_1 and the end time T_2 of this phase Ph_2 are entered in FIG. 4. In this time, the failure behavior of the system can be described with an exponential distribution and the failure rate $\lambda(t)$ is constant over time and is designated in abbreviated form by $\lambda$. Failures in the phase Ph_2 result, for example, from incorrect operations, incorrect ambient conditions (dampness, vibrations, voltage peaks), noncompliance with maintenance intervals.

The MTBF value of a system gives the mean time period between two failures of the system. The MTBF value of a component correspondingly gives the mean time period between two failures of the component. The MTBF value can be determined as a quotient formed from the entire operating time of the system or of the component and the number of failures during this operating time.

If T_b designates the operating time defined above and n designates the number of failures, the following applies:

$$MTBF=T\_b/n$$

If the failure rate $\lambda(t)$ is assumed to be constant over time, the following applies:

$$MTBF=1/\lambda \text{ and } \lambda=1/MTBF=n/T\_b.$$

The mean time period in which the system or a component operates satisfactorily is designated as a "mean time to failure" (MTTF). The MTTF can be determined as a quotient formed from the sum of the use times (=net production times) of the system or of the component and the number of failures during this operating time.

If T_n designates the sum of the use times defined above, and n designates the number of failures, the following applies:

$$MTBF=T\_n/n.$$

The MTTR value of the system is the mean time period which is required for repair after a failure. The MTTR value of a component is the mean time period which is required for repair after a failure if the component has failed. The MTTR value can be determined as a quotient formed from the sum of the technical down times of the system or the component and the number of failures during this operating time.

If T_t is the sum of the technical down time defined above and n is the number of failures of the system, the following applies:

$$MTTR = T\_t/n.$$

Furthermore, the following applies:

$$MTBF = MTTR + MTTF.$$

The MTTR value, that is to say the mean time period for repair, is composed, according to EN 61703/2002, of the following individual time periods:
- the mean administrative delay (MAD) which includes the reaction time of the maintenance personnel and the time for troubleshooting (analysis, diagnosis, decision about repair),
- the mean logistic delay (MLD) as the time for acquiring or providing required spare parts,
- the mean repair time (MRT) as the time for the actual repair,
- the mean technical delay (MTD) as a time period between the end of the repair time itself up to the re-acquired operational capability of the system.

During the actual repair, for example access to the part causing the fault is provided, the part is removed and a new part is installed or the part is repaired and installed again. During the mean technical delay, the system is restored, during which time it is, for example, installed, set, warmed up and tested, and run up again.

The calculation of the mean time period to the repair is preferably simplified by calculating it as a sum of
- the mean repair time (MRT value)
- and the mean technical delay (MTD value).

An embodiment of the way in which the device according to the invention acquires data and uses this data to determine the values to be predicted is described below. The following example relates to the situation in which a manufacturer of motor vehicles wishes to acquire a new system for manufacturing cylinder heads. The motor vehicle manufacturer specifies the system to be acquired and different system manufacturers provide said motor vehicle manufacturer with competing offers for a system according to the specification.

On the network subscriber computer 20.1 at the premises of the system operator, the Internet access program 190.1 generates an electronic form in which a user at the system operator's, for example a maintenance engineer for systems, makes definitions.

In one preferred embodiment, the form is divided into four areas:
- An identifier for the tender, for example a project name and an enquiry number as well as the latest deadline for issuing an offer are entered in the area "administration data". A category of systems is defined and a specification, for example a schedule of specifications, for the system is joined to the administration data. By selecting a category, a parts list 120.1 and a components list 130.1 with the components of the system which are characterized as maintenance-intensive are defined. Furthermore, the operator registers the name and further information about a contact person with the system operator.
- The user, preferably an employee of the system operator, enters inter alia the following information in the area "system data":
- the category to which the system belongs, for example manufacturing system for cylinder heads,
- the planned service life of the system, for example 10 years,
- the planned number of cylinder heads which are to be manufactured on this system per time unit, for example number per year,
- the planned production time, for example in hours per year,
- the shift model, the length of shifts and the working days while the system is being used.

The information which the operator gives to the system operator is made available to various system manufacturers so that they can issue offers. In the following example these include two system manufacturers which have access to the tender via the two network subscriber computers 20.2 and 20.3.

On the two network subscriber computers 20.2 and 20.3, the Internet access program 190.2 and 190.3 generates an electronic form in which a user at the system manufacturer's, for example a system designer, enters values.

In one preferred embodiment, the form for the system manufacturer is divided into the following areas:
- In the area "administration data" the user can consider the administration data predefined by the system operator, for example identifier for the tender and components list, without being able to make changes. The user of the system manufacturer enters an identifier for his offer, for example an offer number, and administration information, for example name of the system manufacturer and of the contact person for this offer.
- The operator at the system manufacturer's only has reading access to the area "system data", specifically to the data described above.
- Two form areas "maintenance data" and "failure data" are generated for each maintenance-intensive component.

The form area "maintenance data" for a group of parts B_i has the following input fields:
- one input field for the number of groups of parts B_i of the same type in the superordinate function group,
- in one input field it is possible the time taken for planned maintenance measures, that is to say for measures which are carried out in the maintenance time T_w on one part from the group of parts B_i, for example planned maintenance, inspection and cleaning. This time is specified, for example, as hours per year.
- In a further input field the planned costs for parts which are required in the time unit for the measures to be carried out on the group of parts B_i in the maintenance time T_w, for example parts which are technically necessary for maintaining operation, are entered.
- In a further input field, the planned costs for consumables, which are consumed overall for the planned maintenance, for example lubrication oil, are entered.

The form area "failure data" for a group of parts B_i has the following input and output fields:
- one input field for the setpoint MTBF value of the group of parts B_i,
- two input fields for the setpoint MRT value and for the setpoint MTD value of the group of parts B_i and one input field for the setpoint MTTR value of the group of parts B_i which is calculated therefrom,
- one input field for the planned costs for re-acquiring the group of parts B_i,
- one input field for the planned service life of the group of parts B_i.

The form area "maintenance data" for a function group F_j has the following input and output fields:
- one input field for the number of function groups F_j of the same type in a system,
- one output field for the time required for planned maintenance measures on the function group F_j, which is calculated, as described below, from time taken for planned maintenance measures on the groups of parts of the function group F_j, one output field for the planned costs for parts which are required for the measures carried out on the function group F_j in the maintenance time T_w, one output field for the planned costs for consumables which are recquired for the measures carried out on the function group F_j in the maintenance time T_w.

The form area "failure data" for a function group F_j has the following input and output fields:

one output field for the setpoint MTBF value of the function group F_j which is calculated, according to a computation rule specified below, from the setpoint MTBF values of the maintenance-intensive groups of parts of the function group F_j, one output field for the setpoint MTTR value of the function group F_j which, according to a computational rule specified below, is calculated from the setpoint MTTR values of the maintenance-intensive groups of parts of the function group F_j, one input field for the planned costs for re-acquiring the complete function group F_j, one input field for the planned service life of the function group F_j.

The data which is sent to the input fields is sent to the network central computer 10 from the respective network subscriber computer 20.1 or 20.2 or 20.3. The calculations are preferably carried out on the network central computer 10, specifically for example using the Internet response program 180. This configuration makes it possible to make available as few programs as possible in a decentralized fashion on the network subscriber computers 20.1, 20.2, 20.3 and to allow as many calculations as possible to be carried out in a centralized fashion.

It is also possible for the device not to acquire the data using forms of an Internet access program 190.2 or 190.3 but rather using an electronic table of a table calculation program (not illustrated) in which the users enter the required values and which carries out calculations. For example, such a table calculation program is installed locally on each of the three network subscriber computers 20.1, 20.2, 20.3 and carries out the calculations there.

The failure frequencies and down times are used for the decision in favor of an offer. An offer by a system manufacturer may relate to a system which is already in use. However, it can also relate to a system which is not even manufactured yet but instead is, for example, just being designed on the basis of the specification.

The device according to the invention determines as follows the MTBF value to be predicted and the MTTR value to be predicted for a system from the setpoint MTBF values and the setpoint MTTR values of components: it will be assumed that $B\_1, \ldots, B\_n$ are the different maintenance-intensive components of a system. These components are listed in the electronic components list. It will be assumed that $N\_1, \ldots, N\_n$ are the numbers of the components $B\_1, \ldots, B\_n$ respectively occurring in the system. The system therefore comprises N_1 components B_1, of the same type, and N_2 therefore comprises components B_2 of the same type, and so on. The definition of the components is valid for the category of systems for manufacturing cylinder heads and thus for all offered systems. The failure of one of these components leads to the failure of the system. The maintenance-intensive components are, as it were, connected in series.

It will be assumed that $MTBF\_B\_1, \ldots, MTBF\_B\_n$ are the setpoint MTBF values, and $MTTR\_B\_1, \ldots, MTTR\_B\_n$ are the setpoint MTTR values of the n maintenance-intensive different components of a technical system. The MTBF value MTBF_Sys to be predicted and the MTTR value MTTR_Sys to be predicted are then calculated according to the following rule:

$$\text{MTBF\_Sys} = \frac{1}{\lambda\_\text{Sys}} = \frac{1}{\sum_{i=1}^{n} N\_i * \lambda\_i} = \frac{1}{\sum_{i=1}^{n} \frac{N\_i}{\text{MTBF\_B\_i}}}$$

and $$\text{MTTR\_Sys} = \frac{\sum_{i=1}^{n} N\_i * \lambda\_i * \text{MTTR\_B\_i}}{\sum_{i=1}^{n} N\_i * \lambda\_i} = \frac{\sum_{i=1}^{n} N\_i * \frac{\text{MTTR\_B\_i}}{\text{MTBF\_B\_i}}}{\sum_{i=1}^{n} \frac{N\_i}{\text{MTBF\_B\_i}}}$$

As described above, MTTR_B_i is preferably calculated in simplified form according to the rule $$MTTR\_B\_i = MRT\_B\_i + MTD\_B\_i$$

where MRT_B_i is the setpoint MRT value, and MTD_B_i is the setpoint MTD value for the component B_i.

The computational rules above are applied, on the one hand, to calculate the setpoint MTBF value and the setpoint MTTR value of a function group F_j from the setpoint MTBF values and the setpoint MTTR values of the maintenance-intensive groups of parts of this function group F_j. F_j then functions as the system of the computational rule. On the other hand, the computational rules are applied to calculate the MTBF value to be predicted and the MTTR value to be predicted for a system from the setpoint MTBF values and the setpoint MTTR values of the maintenanceintensive function groups of this system. The system then functions as the system of the computational rule.

According to the computational rules described above, the setpoint MTBF value and the setpoint MTTR value of each maintenance-intensive function group are preferably firstly calculated from the setpoint MTBF values and setpoint MTTR values of the maintenance-intensive groups of parts. Then, according to the same computational rules the MTBF value and the MTTR value of an offered system are calculated from the setpoint MTBF values and the setpoint MTTR values of the maintenance-intensive function groups of this system. This calculation is carried out for each offered system. As a result, a prediction for the MTBF value and one for the MTTR value is determined for each offered system.

The time required Inst_j for planned maintenance measures on the function group F_j is calculated as follows:

$$\text{Inst\_j} = \sum_{k=1}^{m} M\_k * \text{Inst\_k}$$

Here, $Bg\_1, \ldots, Bg\_m$ are the different groups of parts of the function group F_j. $M\_1, \ldots, M\_m$ indicates how often these groups of parts occur in the function group F_j, and Inst_k designates the maintenance costs for one part of the group of parts Bg_k for $k=1, \ldots, m$. Correspondingly, the time required Inst for planned maintenance measures on the system Correspondingly, the costs KB_j for parts which are acquired for the measures carried out on the function group F_j in the maintenance time T_w are calculated according to the computation rule $$KB\_j = \sum_{k=1}^{m} M\_k * KB\_k$$

Here, KB_k designates the costs for parts which are required for the maintenance of a part from the group of parts Bg_k for k=1, ..., m.

As stated above, the planned service life of the system is recorded. The planned service life of each recorded component is recorded. If the planned service life of a component is shorter than the planned service life of the system, the planned service life of a component is taken into account in the recording of the setpoint MTBF value of this component. For example, the setpoint MTBF value is equal to the quotient formed between the planned service life and planned number of failures during the service life. Furthermore, re-acquisition of the component during the service life of the system is necessary so that the costs for re-acquisition of the component are included in the maintenance costs of the system.

Different system manufacturers preferably submit offers for manufacturing systems. The failure data and maintenance data described above is recorded for each offered system. The device generates a comparison of the offered systems. The device predicts an MTBF value and an MTTR value for each system. This comparison is preferably in the form of a table with one line per offered system. The table has the following columns:
- one for the predicted MTBF values of the systems,
- one for the predicted MTTR values of the systems,
- one for the time taken for planned maintenance measures which are respectively carried out on a system per time unit, for example in [h/year],
- planned costs for parts which are respectively required for the maintenance of the system, for example in [€/year],
- planned costs of consumables which are respectively required for the maintenance of the system, for example in [€/year].

At least one of the offered systems is preferably selected, inter alia, on the basis of the data which is displayed in the comparison. A contract is concluded with each manufacturer or supplier of a selected system. Inter alia the following values are agreed in this contract:
- the setpoint MTBF value of each maintenance-intensive group of parts of the system, and
- the setpoint MTTR value of each maintenance-intensive group of parts of the system.

It is possible also to agree the following values contractually:
- the MTBF value of the system predicted with the device according to the invention, and
- the predicted MTTR value of the system.

The predicted and agreed values of the system, in particular the setpoint MTBF value and the setpoint MTTR value of each maintenance-intensive group of parts are checked during ongoing operation of the system. For this purpose, a log is kept of at which time which maintenance-intensive group of parts has failed and how long it took to recover from this failure. In order to determine the actual repair time of a failed group of parts and to be able to compare it with the setpoint MTTR value of the group of parts, only the times for the actual repair and the time periods between the end of the repair time itself up to the re-acquired operational capability of the system, that is to say the actual MRT value and the actual MTD value of the group of parts, are determined and added.

Figure 5:
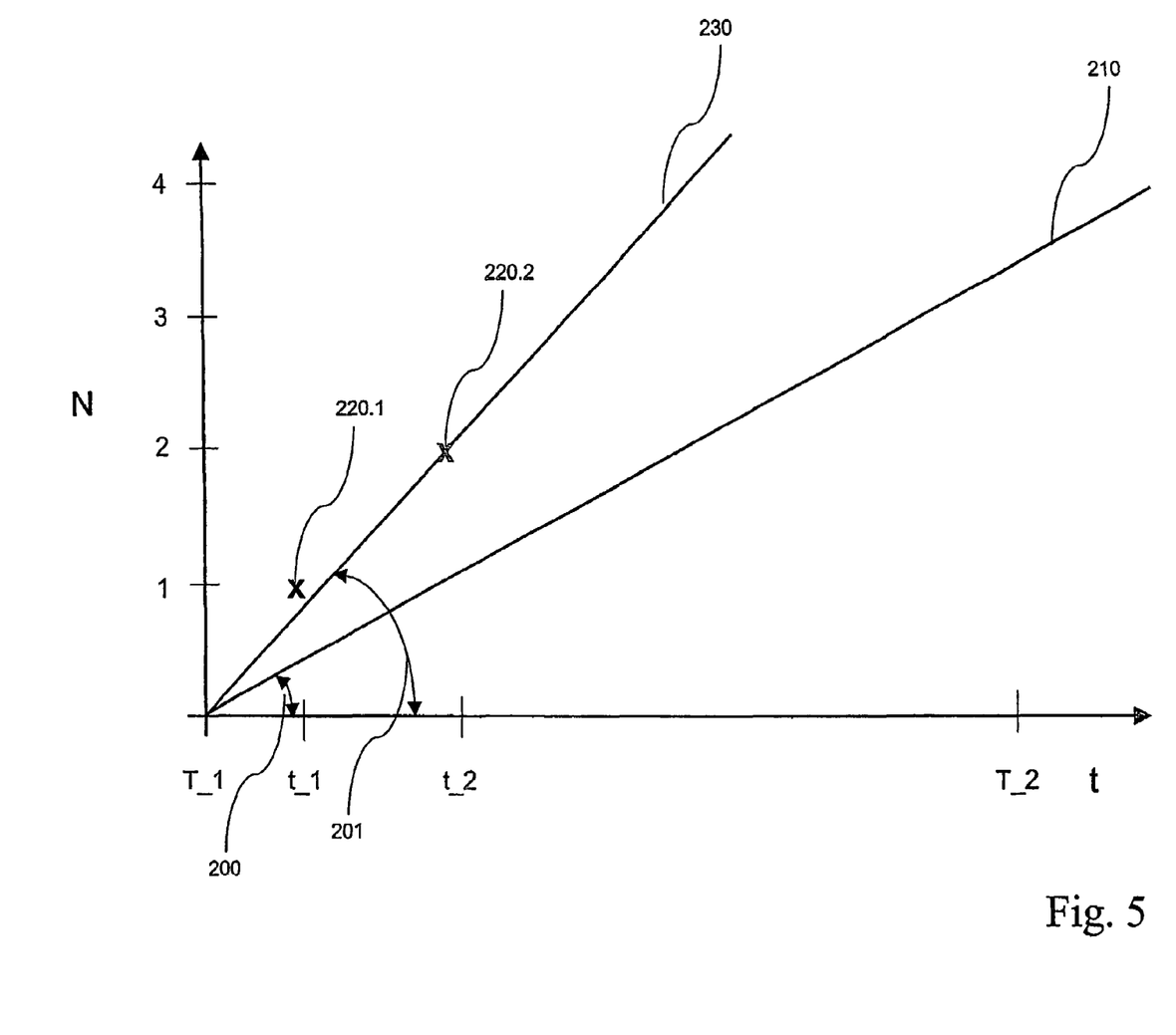
FIG. 5 shows a comparison of the setpoint MTBF value and actual MTBF value of a group of parts.

FIG. 5 illustrates by way of example a comparison of the setpoint MTBF value with the actual MTBF value of a group of parts Bg. The time is entered on the x axis. In this context, only failures in the phase Ph_2 of the random failures are taken into account, for which reason the times T_1 and T_2 from FIG. 4 are entered. The number N of failures is entered on the y axis.

The straight line 210 shows the setpoint failure behavior of the group of parts Bg and results from the setpoint MTBF value. The straight line 210 runs through the origin and its gradient is determined in such a way that the tangent of the angle 200 is equal to the setpoint failure rate λ_Bg of the group of parts Bg which is assumed to be constant over time. For the gradient m_210 of the straight line 210 the following therefore applies:

$m\_210 = \tan(200) = \lambda\_Bg = 1/MTBF\_Bg.$

At the times t_1 and t_2 the first two failures of the group of parts occur in the phase Ph_2. For this reason, the two items 220.1 and 220.2 are entered. Up to the time t_2, two failures have occurred, and the y value is therefore equal to two. The straight line 230 is positioned through the origin and the item 220.2. The gradient m_230 of the straight line 230 and thus the instantaneous actual failure rate λ_Bg(t_2) in the time period from T_1 to t_2 is determined in such a way that the following applies:

$m\_230 = \tan(201) = \lambda\_Bg(t\_2) = 1/MTBF\_Bg(t\_2).$

The quotient m_230/m_210 is preferably compared with a predefined threshold value. If the quotient exceeds the threshold, suitable measures for reducing the number of failures in the group of parts Bg are triggered.

The method described above is carried out during the entire phase Ph_2. The quotient formed from the gradient of the straight line for the actual failure behavior and the gradient m_210 of the straight line 210 is determined continuously and compared with the threshold value. As a result the monitoring functions as an early warning system in order to identify quickly, and at low cost, those groups of components which fail more frequently than planned. The actual MTBF values and MTTR values of the maintenance-intensive components are transferred to the manufacturer of the monitored system. Groups of parts with excessively high MTBF or MTTR values are then subjected, for example, to design improvements or the conditions of use of the system are changed so that such components fail less frequently in future.

This exemplary embodiment of the invention thus provides a resource for identifying those components for which design improvements are necessary and expedient, specifically the maintenance-intensive components which have correspondingly failed more frequently than the setpoint MTBF value.

List of Reference Symbols

| Symbol | Meaning |
|---|---|
| 10 | Network central computer |
| 20.1, 20.2, ... | Network subscriber computer |
| 110.1, 110.2 | Electronic system list |
| 120.1, 120.2 | Generic electronic parts list |
| 130.1, 130.2 | Electronic components list |
| 170 | Linking software |
| 180 | Internet response program |

-continued

| Symbol | Meaning |
| --- | --- |
| 190.1, 190.2, ... | Internet access programs |
| 191.1 | Table calculation program |
| 192.1 | Interface program |
| 200 | Angle between x axis and setpoint failure behavior |
| 201 | Angle between x axis and actual failure behavior in the time period from T__1 to t__2 |
| 220.1, 220.2 | Down times |
| 230 | Actual failure behavior in the time period from T__1 to t__2 |
| 300.1, 300.2, ... | Input fields for setpoint MTBF values of components |
| 301.1, 301.2, ... | Input fields for setpoint MTTR values of components |
| 302 | Calculation device |
| 303 | Screen |
| 304 | Form |
| 305 | "Actual data processing device" |
| 310 | Keyboard |
| B__1, ..., B__n | Maintenance-intensive components of a system |
| Bg__1, ..., Bg__m | Maintenance-intensive groups of parts of a function group |
| F__j | Maintenance-intensive function group |
| MAD | Mean administrative delay |
| MLD | Mean logistic delay |
| MRT | Mean repair time |
| MTBF | Mean time between failure |
| MTD | Mean technical delay |
| MTTR | Mean time to repair |
| Ph__1 | Phase of early failures |
| Ph__2 | Phase of random failures |
| Ph__3 | Phase of failures due to wear |
| T__b | Operating time |
| T__n | Use time = net production time |
| T__o | Organizational down time |
| T__s | Planned idle time |
| T__t | Technical down time |
| T__w | Maintenance time |

What is claimed is:

1. A method for predicting a mean time period between two failures of a technical system, an electronic components list being predefined, the electronic components list comprising maintenance-intensive components of the technical system in which each failure of a component of the components list leads to a failure of the system, the method comprising the following steps carried out using an electronic data processing system:
acquiring of a setpoint MTBF value for each component of the components list,
summing of all reciprocal values of the setpoint MTBF values acquired for the components of the components list, and
using a reciprocal value of the sum of the reciprocal values as a mean time period predicted between two failures of the technical system.

2. The method as claimed in claim 1 wherein, for each component of the components list,
actual times at which one of the components fails are logged, and
the one component is compared with the acquired setpoint MTBF value.

3. The method according to claim 1 wherein the components list is valid for a category of technical systems which carry out the same functions, the prediction is made for a plurality of systems of the category, and a comparison of the predicted failure frequencies and down times of the plurality of systems is generated.

4. The method as claimed in claim 3 wherein a partial comparison of the predicted failure frequencies and down times in the plurality of systems list is generated for each component of the components list during the generation of the comparison and is inserted into the comparison.

5. The method as claimed in claim 1 further comprising:
additionally acquiring a setpoint MTTR value for each component of the components list, and
calculating of a prediction of a mean time period for fault recovery in the technical system as a weighted mean of the acquired setpoint MTTR values of the components of the components list, the reciprocal values of the setpoint MTBF values of the components of the components list being used as weighting factors.

6. The method as claimed in claim 5 wherein when the setpoint MTTR value of at least one component is acquired the following steps are carried out:
acquiring of a setpoint MRT value and of a setpoint MTD value of this component, and
using the sum of the setpoint MRT value and setpoint MTD value of this component as the setpoint MTTR value of this component.

7. The method as claimed in claim 5 further comprising procuring the technical system.

8. The method as claimed in claim 5 further comprising using the mean time period to be predicted between two failures to predict maintenance issues of the technical system.

9. The method as claimed in claim 5 further comprising using the mean time period to be predicted between two failures to predict costs of maintaining the technical system.

10. The method as claimed in claim 5 further comprising selecting the technical system of the second technical system and concluding a contract with the supplier of the selected technical system.

11. The method as claimed in claim 5 further comprising comparing the mean time period to be predicted between two failures of the technical system to a mean time period to be predicted between two failures of a second technical system.

12. The method as claimed in claim 11 further comprising deriving technical improvement possibilities from the comparison of the mean time period to be predicted between two failures of the technical system and the mean time period to be predicted between two failures of the second technical system.

13. An apparatus for predicting a mean time period between two failures of a technical system, an electronic components list being predefined, the electronic components list comprising maintenance-intensive components of the technical system in which each failure of a component of the components list leads to a failure of the system, comprising:
means for acquiring of a setpoint MTBF value for each component of the components list,
means for summing of all reciprocal values of the setpoint MTBF values acquired for the components of the components list, and
means for using a reciprocal value of the sum of the reciprocal values as a mean time period predicted between two failures of the technical system.

14. The apparatus as claimed in claim 13 further comprising means for logging, for each component of the components list, actual times at which one of the components fails are logged and means for comparing the one component with the acquired setpoint MTBF value.

15. The apparatus according to claim 13 wherein the components list is valid for a category of technical systems which carry out the same functions, the prediction is made for a plurality of systems of the category and further comprising means for generating a comparison of the predicted failure frequencies and down times of the plurality of systems.

16. The apparatus as claimed in claim 15 wherein the means for generating also generates a partial comparison of the predicted failure frequencies and down times in the plurality of systems for each component of the components list during the generation of the comparison and the partial comparison is inserted into the comparison.

17. The apparatus as claimed in claim 13 further comprising:
   means for additionally acquiring a setpoint MTTR value for each component of the components list, and
   means for calculating of a prediction of a mean time period for fault recovery in the technical system as a weighted mean of the acquired setpoint MTTR values of the components of the components list, the reciprocal values of the setpoint MTBF values of the components of the components list being used as weighting factors.

18. The apparatus as claimed in claim 17 wherein the means for additionally acquiring a setpoint MTTR value for each component of the components list also acquires a setpoint MRT value and of a setpoint MTD value of each component and uses the sum of the setpoint MRT value and setpoint MTD value of each component as the setpoint MTTR value of each component.

19. The apparatus as claimed in claim 17 further comprising means for using the mean time period to be predicted between two failures to predict maintenance issues of the technical system.

20. The apparatus as claimed in claim 17 further comprising means for using the mean time period to be predicted between two failures to predict costs of maintaining the technical system.

21. The apparatus as claimed in claim 17 further comprising means for comparing the mean time period to be predicted between two failures of the technical system to a mean time period to be predicted between two failures of a second technical system.

22. The apparatus as claimed in claim 21 further comprising means for deriving technical improvement possibilities from the comparison of the mean time period to be predicted between two failures of the technical system and the mean time period to be predicted between two failures of the second technical system.

* * * * *